Figure 1:
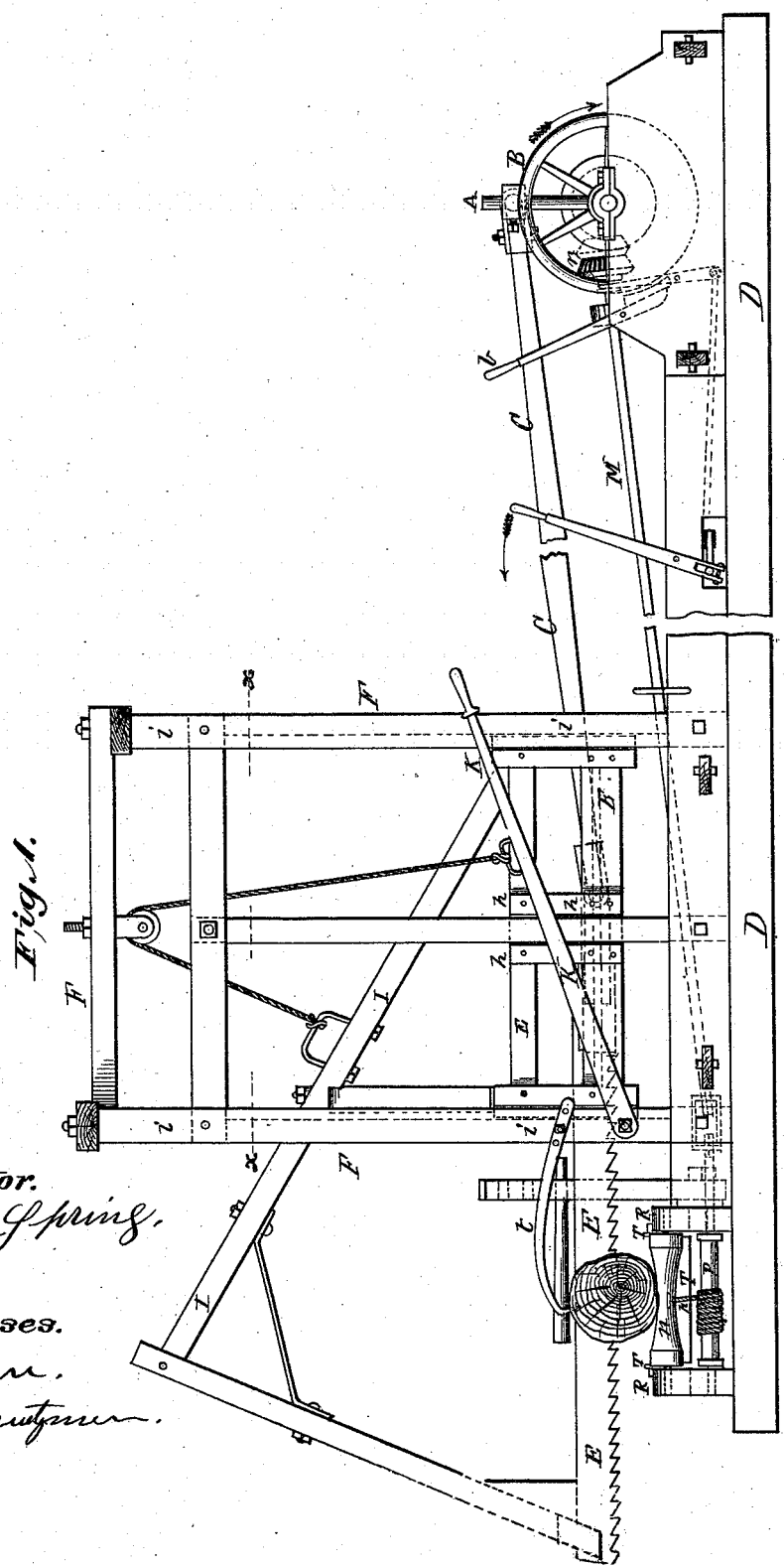

W. SPRING.
Sawing-Machines.
No. 156,442.
2 Sheets--Sheet 2.
Patented Nov. 3, 1874.
Fig. 2.
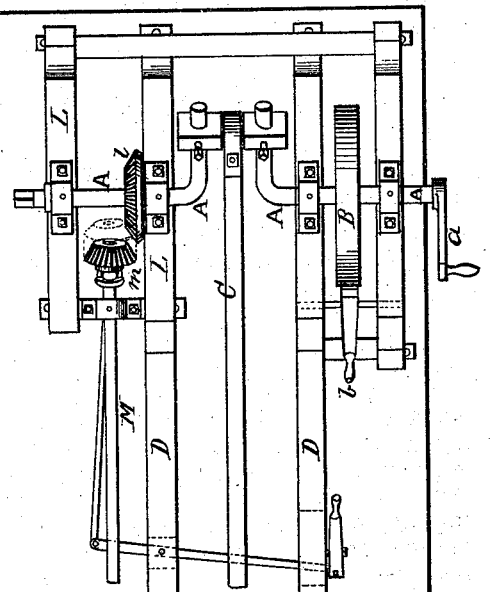
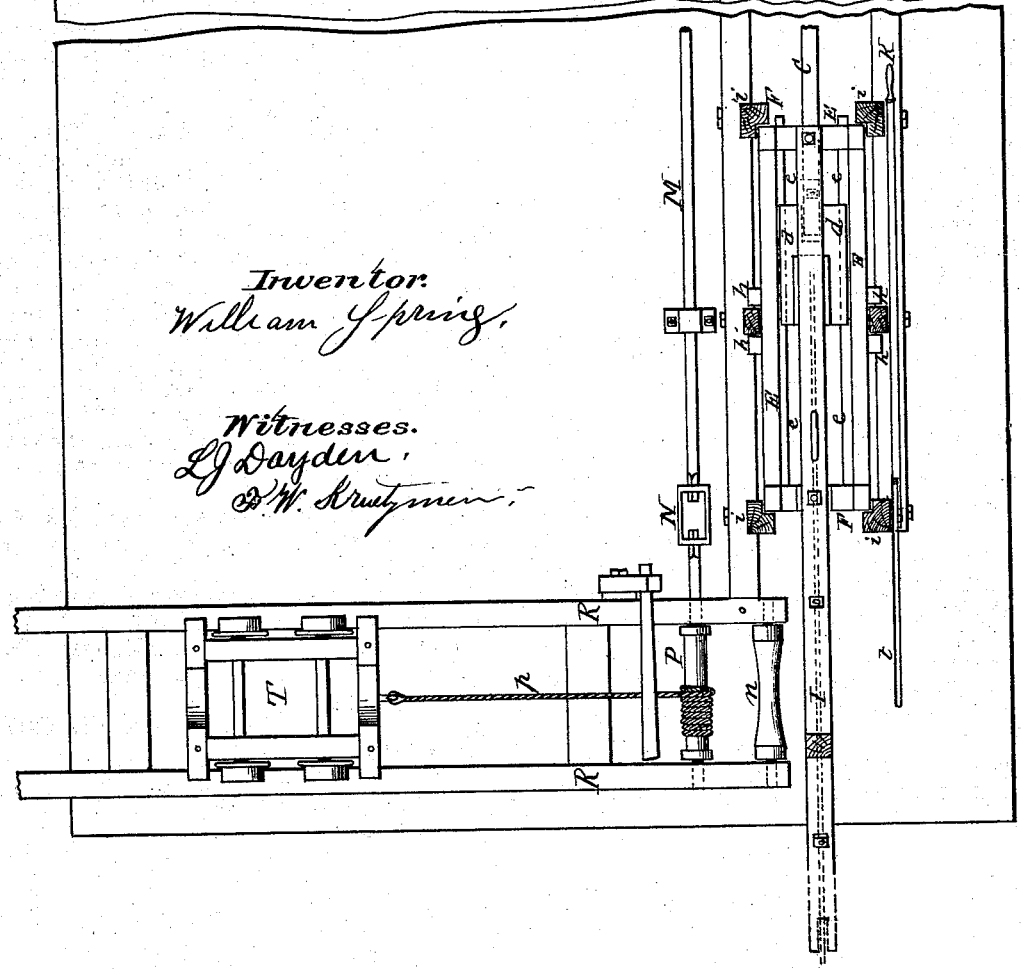
Inventor:
William Spring
Witnesses.
L J Dayden
D W Kruetzmen

UNITED STATES PATENT OFFICE.

WILLIAM SPRING, OF WARREN COUNTY, MISSOURI.

IMPROVEMENT IN SAWING-MACHINES.

Specification forming part of Letters Patent No. 156,442, dated November 3, 1874; application filed July 10, 1873.

*To all whom it may concern:*

Be it known that I, WILLIAM SPRING, of Warren county, in the State of Missouri, have invented an Improved Sawing-Machine, of which the following is a specification:

The invention relates to devices for operating drag-saws; and it consists in providing a crank-shaft, which is suitably mounted upon a frame, and to which, removed from the saw, is attached a fly-wheel that is controlled by a hand-brake, as will appear with greater particularity hereinafter.

The object of the invention is to provide a convenient means of controlling the operation of the saw and the machinery by which it is operated.

Figure 1 is a side elevation of a device embodying the elements of the invention. Fig. 2 is a top or plan view of the same.

A is a crank-shaft, operated in any suitable manner, to the crank-pin of which is attached the pitman C, which extends forward between and parallel to the sides of the frame D, its front end being pivoted to the rear end of the drag-saw E, which, adjacent to this end, is furnished with guides d, working upon ways e on each side of the frame F, which is movable vertically upon the slides h, arranged parallel to and midway between the end bars i of the vertical frame F.

The operation of the crank-shaft A is controlled by the hand-brake b, which has a bearing upon the fly-wheel B, that is attached to the shaft A, as shown in Fig. 2.

To the rear end of the frame D is pivoted the rear end of the angle-arm I, which is operated by means of a pulley secured to the top of the frame F, through which passes a cord having one end secured to the arm I, and the other to the lever K, pivoted to the frame F, the front end of the arm being slotted vertically to receive the saw E. Adjacent to the frame which supports the crank-shaft A is placed a second frame, L, across which the extension of the crank-shaft A passes, and upon which, near the frame, is secured the bevel-gear wheel l, meshing with the pinion m on the rear end of the shaft M, which extends through a bearing in the frame L, forward and parallel to the frame D, its front portion passing through a bearing, its extremity being secured in a link, N, to the opposite end of which is attached one end of the roller P, operating in bearings in the frame R, which stands at right angles to the frame D, and has its end adjacent the saw E. The upper front corner of the frame R is supplied with a roller, n, on the same level as the upper surface of the truck T, which moves upon the upper edge of the frame R as a track, the truck being connected with the roller P by a cord or chain, p, which is wound up as the roller P is rotated, thus causing the truck to approach the saw. The device is further provided with the curved pointed gaff t, for holding the log in position, and also with lever and rods for throwing the shaft M into or out of gear. The means of elevating the saw E permits operation upon logs or material of any thickness.

I do not claim the device I have described as a whole, nor any single element or part thereof; but

What I claim as my invention, and desire to secure by Letters Patent, is—

The combination of the crank-shaft A, pitman C, saw E, wheel B, and brake b.

WILLIAM SPRING.

Witnesses:
 DAVID SAVAGE,
 EMANUEL REICHE.